United States Patent [19]
Benzel

[11] Patent Number: 5,982,382
[45] Date of Patent: Nov. 9, 1999

[54] INTERACTIVE SELECTION OF 3-D ON-SCREEN OBJECTS USING ACTIVE SELECTION ENTITIES PROVIDED TO THE USER

[75] Inventor: Mark A. Benzel, San Jose, Calif.

[73] Assignee: Silicon Graphics, Inc., Mountain View, Calif.

[21] Appl. No.: 08/747,939

[22] Filed: Nov. 12, 1996

[51] Int. Cl.⁶ .................................................. G06T 17/00
[52] U.S. Cl. ........................................ 345/438; 345/439
[58] Field of Search ................................ 345/419, 433, 345/326, 339, 352, 970, 977, 355, 976, 438, 439

[56] References Cited

U.S. PATENT DOCUMENTS 5,293,529  3/1994  Yoshimura et al. ................ 345/158
5,357,603  10/1994  Parker ................................. 345/352
5,432,894  7/1995  Funaki ................................ 345/419
5,861,889  1/1999  Wallace et al. .................... 345/433
5,886,700  3/1999  Di Pippo et al. .................. 345/355
5,903,271  5/1999  Bardon et al. ..................... 345/419

*Primary Examiner*—Mark K. Zimmerman
*Assistant Examiner*—Albert Lee
*Attorney, Agent, or Firm*—Sterne, Kessler, Goldstein & Fox P.L.L.C.

[57] ABSTRACT

A three dimensional selection entity for interactively selecting among the displayed objects represented in three-dimensional space. A user selects one of several three-dimensional selection entities provided in accordance with the present invention. The user manipulates the three-dimensional selection entity to designate the three-dimensional space of interest. The objects are deemed to be selected depending on whether the selection entity encompasses at least a portion of the object.

11 Claims, 5 Drawing Sheets

INTERACTIVE SELECTION OF 3-D ON-SCREEN OBJECTS USING ACTIVE SELECTION ENTITIES PROVIDED TO THE USER

BACKGROUND OF THE INVENTION

1. Field of the Invention

The present invention relates generally to the field of graphics systems, and more particularly to a system and method for interactively selecting among three-dimensional objects displayed on a display screen.

2. Related Art

Graphics systems often display three-dimensional (3D) objects on display screens. Graphics systems may also allow a user to manipulate such objects being displayed. For example, a user may cause a 3D-object (e.g., a house) to be rotated at a certain angle to view the object from a different perspective. A graphics system may allow a user to manipulate multiple 3D-objects at the same time. Such a capability typically requires that the user select the objects of interest, and then specify the operation to be performed on the selected objects.

One of several schemes may be provided to enable a user to select the objects of interest. For example, a user may use a rectangle to select all the objects of interest. Typically, the user first specifies a reference position for a rectangle using a mouse button, and then drags the mouse while keeping the mouse button pressed. Dragging the mouse generally expands the rectangle. Once the mouse button is released, the objects within the expanded rectangle at the time the mouse button is released are selected.

Another scheme may use a circle instead of a rectangle. In such a scheme, the user may specify a reference position by pressing a mouse button. The reference position may correspond to the center of the circle. As the user drags the mouse, the radius of the circle may be increased: When the user releases the mouse button, all the objects within the expanded circle are selected.

Schemes such as those described above may be limited in that each of them uses a two-dimensional selection entity for selecting objects represented in three dimensional space, i.e., such selection entities do not typically include the depth dimension. The two dimensional schemes may be inadequate in certain situations. For example, a display may include several objects which are overlapping, either fully or partially. The user may wish to select objects up to only a certain depth. Two dimensional entities such as those described above may not provide the capability to select only some of the overlapping objects.

What is therefore needed is a selection entity which enables the user to select objects according to depth in addition to the two dimensions typically allowed by the two-dimension selection entities.

SUMMARY OF THE INVENTION

The present invention is directed to a system and method of selecting among three dimensional objects displayed on a display screen. The invention has application in several areas such as, without limitation, pharmaceutical research, chemistry, nuclear physics, building architecture, and other areas where three dimensional objects are displayed. The present invention provides a three dimensional selection entity (such as cube, sphere, or torus), with which a user can select objects within a desired space displayed on a display screen.

The present invention uses a bounding box approach, particularly when the displayed object has an irregular shape. By using the bounding box approach, the number of computations required for determining whether the object is partially selected may be reduced. In this approach, the maximum and minimum coordinate components are determined. Using the maximum and minimum coordinate components, a rectangular shaped bounding box is defined. A determination is made as to whether the three dimensional selection entity partially intersects the defined bounding box.

Thus, the present invention enables a user to select among displayed objects represented in three dimensional space using three dimensional selection entities. This feature provides the user with the flexibility to select objects according to depth also.

The user is provided the option to select among a plurality of three-dimensional selection entities. Thus, the user is provided the flexibility to select the appropriate selection entity as may be suitable for a particular situation.

In an embodiment of the present invention, a user is first provided the ability to select among a plurality of three dimensional selection entities. For example, the user selects one of the selection entities from a sphere, a cube, and a torus. The user then manipulates the selected three dimensional selection entity to specify the desired space. In other words, the three-dimensional selection entity is manipulated to designate a three dimensional region/space. Once the manipulation is complete, the objects within the specified (designated) three dimensional space are selected.

The step of manipulating the selection entity depends on the specific interface provided to the user. In one embodiment, the user first specifies a reference point (such as a center of a sphere) and then orients and scales the selection entity. If the specified reference point is a point on a displayed object, the coordinates of the reference point are set to those of the point on the displayed object. If the reference point is not on any displayed object, the user may be prompted to provide the depth coordinate.

After the manipulation of the selection entity, if an object is selected only partially, a determination as to whether the object is deemed to be selected is made according to one of several schemes which may be specified by the user. In a first scheme, the object is deemed to be selected only if the center of the object is within the final space specified by the selection entity. In a second scheme, the object is deemed to be selected only if the whole object is within the final space specified by the selection entity. In a third scheme, the object is deemed to be selected if at least a portion of the object is encompassed by the area designated by the manipulation of the selection entity.

Thus, the present invention provides a three-dimensional selection entity for designating a desired space in a three-dimensional space in which objects are represented. The objects within the designated space may be selected for further manipulation.

The present invention also provides for interactively specifying such desired space by providing graphics user interface, e.g., by using a mouse. Thus, a user may interactively increase or decrease the space using the interface.

The present invention also provides a user the ability to specify one of three schemes to resolve situations in which an object may be partially encompassed within a selection entity.

BRIEF DESCRIPTION OF THE FIGURES

The present invention is pointed out with particularity in the appended claims. The above and further features and advantages of the present invention may be better understood by referring to the following description taken in conjunction with the accompanying drawings, in which:

DETAILED DESCRIPTION OF THE PREFERRED EMBODIMENTS

The present invention provides a three dimensional selection entity (such as a sphere or a cube) to enable a user to select objects being presently displayed on a display screen. The objects are represented in a three-dimensional space. An embodiment in accordance with the present invention enables a user to interactively designate a desired space within the three-dimensional space in which the objects are represented. The objects in the designated space are selected. The invention has application in several areas such as pharmaceutical research, chemistry, biotechnology, and other areas where three dimensional objects are displayed.

The invention is described in the context of a computer system which displays objects represented in a three dimensional space. Typically, the computer system maps the objects into two dimensional space, and displays them on a display screen according to techniques well known in the art. The present invention allows a user to select the displayed objects interactively as described with reference to the flow-chart of FIG. 1.

It will be apparent to one skilled in the relevant arts to practice the present invention based on the description provided herein. For example, the present invention can be implemented in software, hardware, firmware or a combination of the like by a programmer (or designer) on one of several computer systems (e.g., O2™ Line of Work Stations from Silicon Graphics, Inc.) readily available in the market place.

Figure 1:
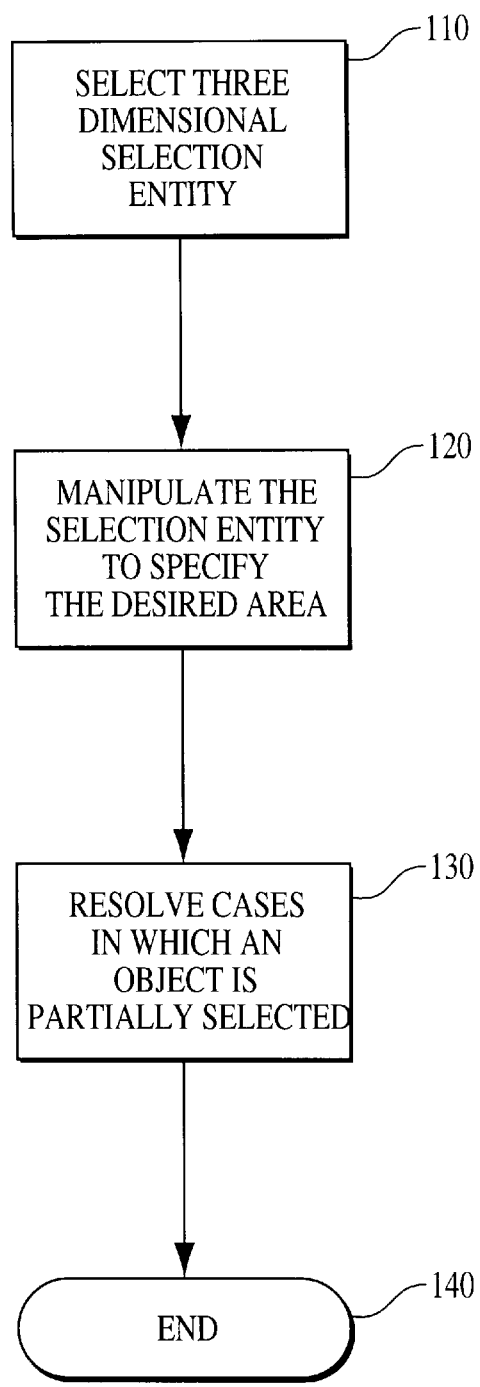
FIG. 1 is a flow-chart illustrating the steps performed for selecting among the displayed objects in one embodiment of the present invention.

The flow-chart of FIG. 1 is now described in detail. In step 110, a user of a computer system selects one of the available three dimensional selection entities. In one embodiment, the available selection entities include a sphere, a cube, and a torus. However, it will be apparent to one skilled in the relevant art to implement a selection scheme using other types of three-dimensional selection entities using the disclosure provided herein. Such selection entities are contemplated to include, without limitation, those with irregular or asymmetrical shapes.

The manner of selection depends on the specific selection interfaces provided. In one embodiment, the computer system may display all the available selection entities, and a user may simply click a mouse button while a corresponding cursor is positioned on the desired selection entity. In another option, a user may select the desired selectional entity using a menu option.

In step 120, the user manipulates the selection entity to designate the desired three dimensional space. The manipulation process depends on the specific interface provided to the user. An example method of manipulating the selection entity is explained in detail later with reference to FIG. 2. As the user manipulates the selection entity, the system can display the selection entity also on the display area displaying the three dimensional objects. To help the user visualize the selected objects, the system may display the objects (or portions thereof) encompassed by the selection entity in a predetermined shade or color. Once the manipulation of the selection entity is complete, the objects within the three dimensional space encompassed by the selection entity are selected.

In step 130, the system and method of the present invention resolves situations in which some of the displayed objects are completely encompassed by the selection entity. The resolution entails a decision whether to include a partially selected object. The decision may be based on one of the three schemes as described below.

In a first scheme, an object is deemed to be selected only if the center of the object is within the selection entity. In other words, if the center does not fall within the selection entity, the object is not selected. If the object has an irregular shape or the center is hard to determine otherwise, alternative approaches may be used. For example, a point approximately in the middle of the object may be used instead of the center. Alternatively, a bounding box (explained below) may be defined for the object, and the center of the bounding box may be assumed to be the center of the object.

Thus, once the center of an object is determined, the coordinates of the center are examined to determine whether the center is within the selection entity (as manipulated in step 120). If the center is within the selection entity, the object is deemed to have been selection. Otherwise, the object is deemed not to have been selected.

In a second scheme, an object is deemed to be selected only if the complete object is within the selection entity. In a third scheme, an object is selected if any portion of the object is encompassed by the selection entity. In one embodiment of the present invention, the user may specify a specific scheme as being applicable to a specific object or a subset of the displayed objects. The user may, in addition, specify a default scheme for the selection of objects partially encompassed by the selection entity. Thus, after the performance of step 130, the objects within the space specified by the user are selected.

However, before applying the second and third schemes of step 130, the system may need to first determine whether the object is partially selected. In one embodiment of the present invention, each point on the boundary of the object is examined to determine whether the point falls within the selection entity after completion of step 120. For example, if the selection entity is a sphere, a determination is made as to whether any point on the boundary (or edge) of the object is within a distance equal to the radius of the sphere. If some boundary points are determined to be within the three-dimensional selection entity and others are not, the embodiment determines that the object is only partially selected.

Figure 3:
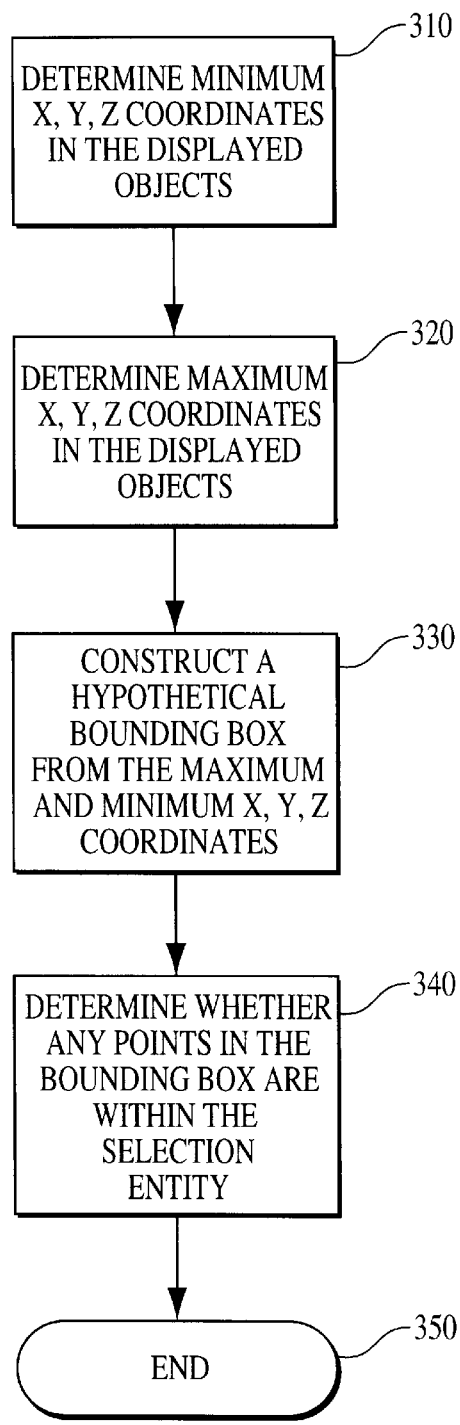
FIG. 3 is a flow-chart illustrating an example of a method for determining whether an object has been partially selected by the three dimensional selection entity.

However, such a scheme may not be particularly suited for objects which have irregular shapes as there may be several points on the edges (boundary). For such irregular shaped objects, a 'bounding box' approach is used to determine whether a displayed object is partially selected as illustrated with reference to the flow-chart of FIG. 3. The bounding box approach is only an example method of determining whether an object is partially selected. The present invention contemplates using other methods to make such a determination. Also, the bounding box approach and other approaches can be used with regular shaped objects (e.g., cone) also according to the needs of particular environments.

In the bounding box approach, a hypothetical rectangular box which encompasses the displayed object is first defined (step 310, 320, and 330). This is also illustrated in an example with reference to FIG. 5 below. A determination is then made as to whether the rectangular box intersects with the selection entity (Step 340). Thus, in step 310, the present invention first determines the minimum X, Y, Z coordinates of the displayed object. For the purpose of explanation we assume such coordinates are $X_{min}$, $Y_{min}$, and $Z_{min}$. Notably, the three components may be from three different points of the displayed object.

In step 320, the present invention determines the maximum coordinate components $X_{max}$, $Y_{max}$, and $Z_{max}$. In step 330, the eight points (termed P0–P7) defining a rectangular hypothetical box are determined from the maximum and minimum coordinate components. For example, the coordinate values of the eight points may be P0=($X_{min}$, $Y_{min}$, $Z_{min}$), P1=($X_{min}$, $Y_{min}$, $Z_{max}$), P2=($X_{min}$, $Y_{max}$, $Z_{min}$), P3=($X_{min}$, $Y_{max}$, $Z_{max}$) P4=($X_{max}$, $Y_{min}$, $Z_{min}$), P5=($X_{max}$, $Y_{min}$, $Z_{max}$), P6=($X_{max}$, $Y_{max}$, $Z_{min}$), and P7=($X_{max}$, $Y_{max}$, $Z_{max}$). Steps 310, 320, and 330 are further explained in an example with reference to FIG. 4 after the explanation of step 340.

In step 340, the present invention determines whether the bounding box is intersected by the selection entity. Due to the regular shape of the bounding box, the computations required may be substantially simplified as is well known in the art. If an intersection is determined, the corresponding displayed object is deemed to be partially selected. It is noted that the bounding box based scheme may result in inaccurate conclusions are to the approximations made. However, it provides an efficient and effective way to determine whether a displayed object is partially selected.

As an improvement, an embodiment may use the bounding box approach for a preliminary determination, and if the approach points to a partial selection, more extensive processing steps may be performed for a final conclusion. For example, such steps for a final conclusion may entail examining each point on the boundary of the displayed object to determine whether the point is within the selection entity. After determining that an object is partially selected, an embodiment of the present invention may use one of the schemes for selection of objects as noted with reference to step 130 of FIG. 1.

Figure 5:
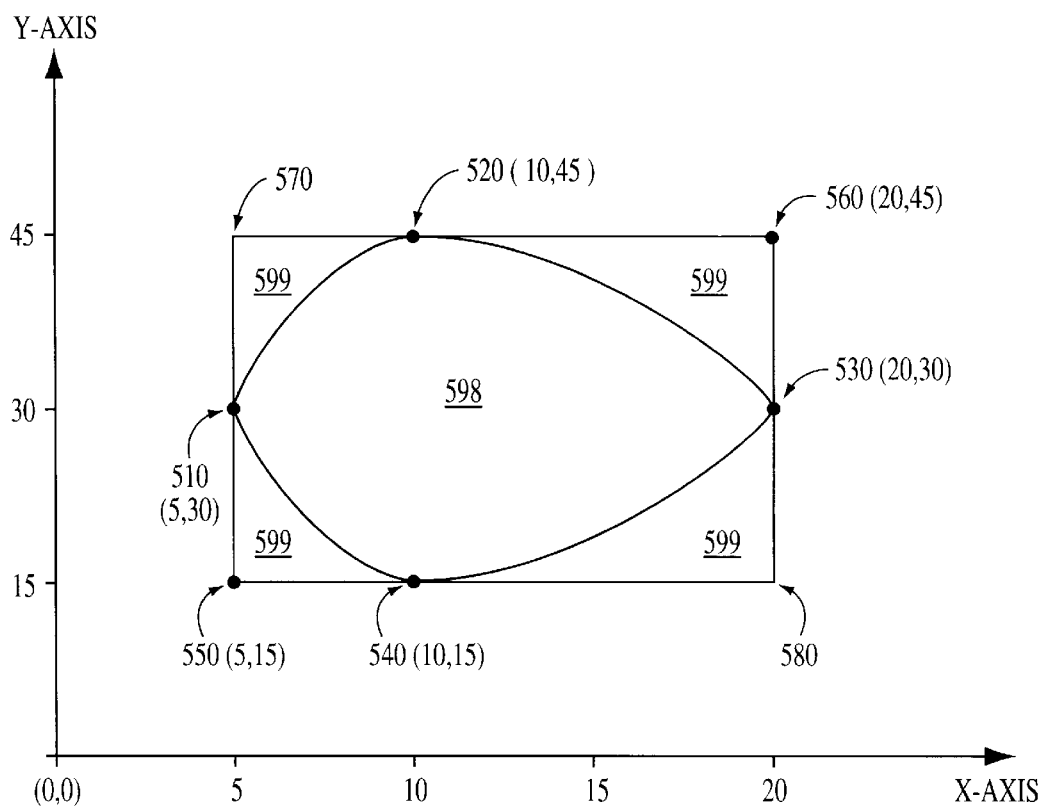
FIG. 5 is a graph illustrating the bounding box approach by way of an example.

Steps 310, 320, and 330 of the bounding box approach are now explained using an example with reference to FIG. 5. For purposes of clarity, the steps are explained in two dimensional space. However, it will be apparent to one skilled in the art to extend the example to three-dimensional space from the disclosure provided herein. Alternatively, the example may be viewed with a Z-coordinate having a value of zero for all points.

FIG. 5 includes a graph with an X-axis and a Y-axis representing an object 598. In step 310, the minimum X and Y coordinates within the object 598 are determined. As can be seen from the diagram, $X_{min}$ is equal to 5 based on point 510 and $Y_{min}$ is equal to 15 based on point 540. In step 320, $X_{max}$ is found to be equal to 20 based on point 530 and $Y_{max}$ is found to be equal to 45 based on point 520. Point 550 with coordinates of ($X_{min}$, $Y_{min}$) and point 560 with coordinates of ($X_{max}$, $Y_{max}$) are sufficient to define the bounding box in step 330. The other points 570 and 580 are defined by the coordinates ($X_{min}$, $Y_{max}$) and ($X_{max}$, $Y_{min}$) respectively. It is again noted that if the selection entity encompasses area 599 (i.e., area within the bounding box but not in the object space) only, an erroneous conclusion about the partial selection of object 598 may be reached.

Figure 2:
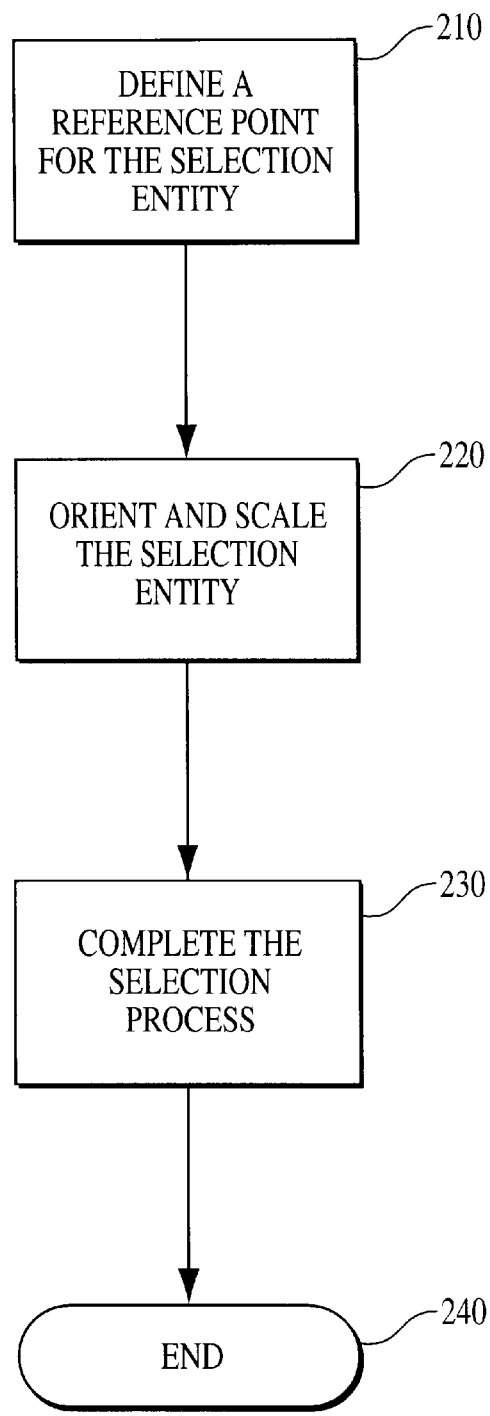
FIG. 2 is a flow-chart illustrating in further detail an example of a method in which a three-dimensional selection entity is manipulated to select among the displayed objects.

Step 120 is now explained in further detail with reference to FIG. 2. As already noted, the specific steps in manipulating the selection entity for selecting the displayed objects depends on the specific user interface provided to the user. However, in the case of symmetrical three dimensional selection entities (e.g., sphere, cone) the step generally entails three broad functions as explained with reference to steps 310, 320, and 330.

In step 310, a reference point for the selection entity is selected. For example, if the selection entity is a sphere, a user may select the center of the sphere. If the selection entity is a cube, the reference point may correspond to a corner point or the center of the cube as the user/designer may specify. It should be understood the details provided here are for explanation purposes only and do not limit the scope and spirit of the invention.

The center may be selected, for example, by clicking the button on a mouse while the cursor is at the desired position. If the selected point is on a displayed object, the selected point is defined by the coordinates of the point on the object. However, if the button is clicked when the cursor is not positioned on any displayed object, the embodiment may have to request the user to provide depth coordinate (typically Z-coordinate).

In step 320, the selection entity is oriented and scaled to encompass the displayed objects in the desired space. Scaling refers to defining the size of the selection entity, and orientation refers to placing the selection entity in a desired direction. In one interface using a mouse, the selection entity grows in the direction in which the user moves the mouse while keeping the button pressed. If the user moves the mouse in the opposite direction after the selection entity has expanded to a specific size, the size of the selection entity may be decreased. The user is allowed the option to move or rotate the selection entity after scaling it if the user desires a different orientation.

In step 330, the user completes the selection process. The completion also depends on the specific interface provided to the user. In a mouse based interface, the user may simply release the mouse button to complete designating the desired space by using the selection entity.

Once the user completes designating the desired space, an embodiment may perform step 130 of FIG. 1 to resolve cases in which an object may not be completely selected as already explained. Thus, the present invention provides a three-dimensional selection entity which enables a user to select objects displayed in a three dimensional space.

Figure 4:
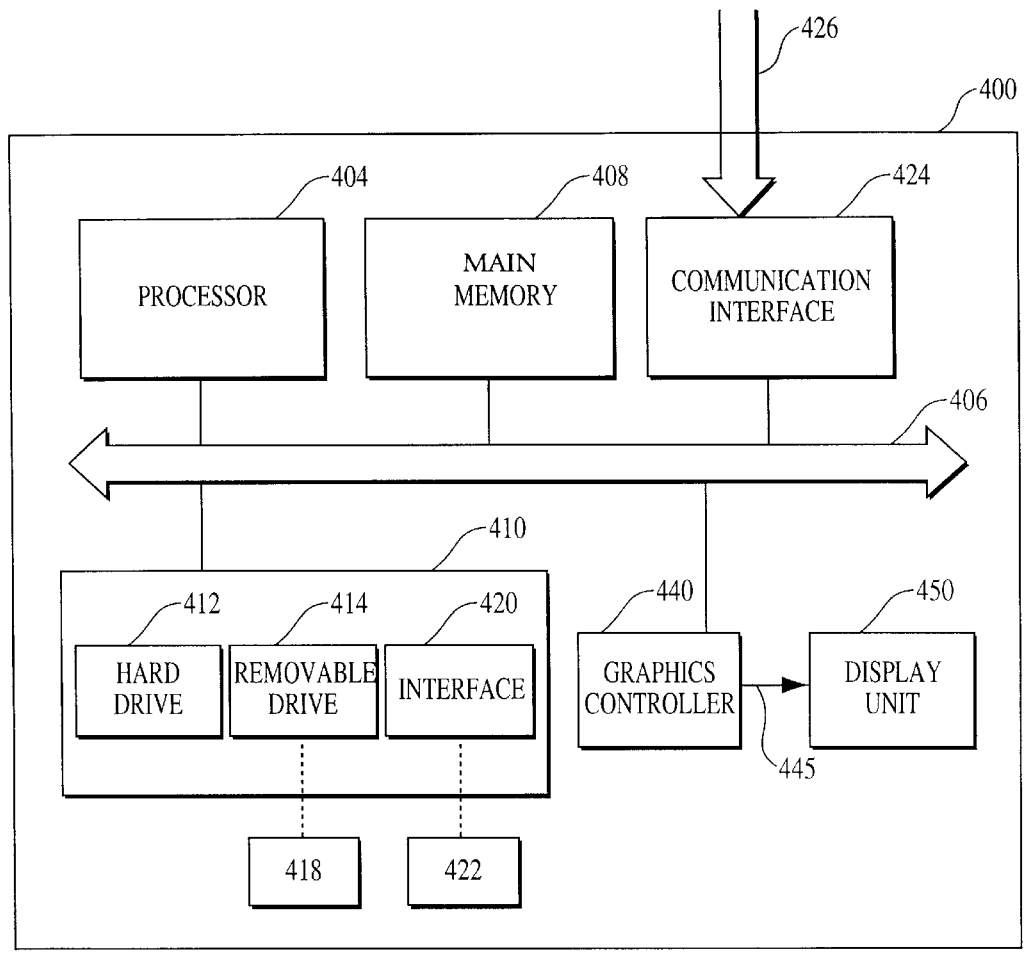
FIG. 4 is a block diagram of an example of a computer system for implementing the present invention.

The structure and operation of an example computer system 400 which may implement the above invention are now explained with reference to FIG. 4. Computer system 400 includes one or more processors, such as processor 404. Processor 404 is connected to a communication bus 406. Various software embodiments are described in terms of this example computer system. After reading this description, it will become apparent to a person skilled in the relevant art how to implement the invention using other computer systems and/or architectures.

Computer system 400 also includes main memory 408 (preferably random access memory), secondary memory 410, graphics controller 440, and display unit 450. In one embodiment, processor 404 performs the steps of the flowchart of FIG. 1 to enable a user to select objects being displayed on display unit 450. Graphics controller 440 works in conjunction with processor 404 to generate display signals on bus 445. In response to the display signals, display unit 450 generates an image including the selection entity, the displayed objects and other portions corresponding to the interface. In general, display unit 450 comprises a display screen with a two-dimensional display area. The three dimensional images are mapped into the display area of the display screen. However, it is envisioned that the present invention may be used with other display technologies as may be required and/or available in the market place.

It should be understood that the functions of the individual components of computer system 400 are provided by way of an example for illustration purposes only. In will be appreciated by one skilled in the relevant art that several modifications may be made to computer system 400 without departing from the scope and spirit of the present invention. For example, some of the functions performed by processor 404 may be performed instead in graphics controller 440. In an alternative embodiment, graphics controller 440 and processor 404 may be implemented in a single semiconductor chip. In general, the functions performed by individual components may be varied depending on the specific design requirements without departing from the scope and spirit of the present invention.

An embodiment of the present invention may be implemented in a software program. The software may be provided to computer system 400 by pre-storing in secondary memory 410. The program instructions may be retrieved into main memory 408 before being processed by processor 404 to enable a user to select objects displayed in three-dimensional space. In an alternate embodiment, computer system 400 may receive the data from an external system.

Secondary memory 410 can include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418, represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar means for allowing computer programs or other instructions to be loaded into computer system 400. Such means can include, for example, a removable storage unit 422 and an interface 420. Examples of such can include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 418 to computer system 400.

Computer system 400 can also include a communications interface 424. Communications interface 424 allows software and data to be transferred between computer system 400 and external devices. Examples of communications interface 424 can include a modem, a network interface (such as an Ethernet card), a communications port, a PCM-CIA slot and card, etc. Software and data transferred via communications interface 424 are in the form of signals which can be electronic, electromagnetic, optical or other signals capable of being received by communications interface 424. These signals 426 are provided to communications interface via a channel 428. This channel 428 carries signals 426 and can be implemented using wire or cable, fiber optics, a phone line, a cellular phone link, an RF link and other communications channels.

In this document, the terms "computer program medium" and "computer usable medium" are used to generally refer to media such as removable storage device 418, a hard disk installed in hard disk drive 412, and signals 426. These computer program products are means for providing software to computer system 400.

Computer programs (also called computer control logic) are stored in main memory and/or secondary memory 410. Computer programs can also be received via communications interface 424. Such computer programs, when executed, enable the computer system 400 to perform the features of the present invention as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

An example application of the present invention is now described. A common use for three dimensional object selection in chemistry is to query the currently displayed molecule (or molecules) about its 3D characteristics. As is well appreciated in the relevant art, a molecule comprises several atoms connected by bonds. The molecules may be modeled in a computer system in a three dimensional space. If there are a large number of atoms and bonds displayed on the screen of display unit 450, it is often difficult to see the spatial relationships between all of the atoms and bonds. Therefore, the various 3D selection tools can be used to determine these spatial relationships. Examples illustrating such uses are now described.

One example entails determining if the atoms in the molecule(s) are within a specified distance of a given atom. A sphere selection tool would be used in this case. The center of the tool's selection sphere would be located on the given atom. When the selection sphere radius matches the desired distance specified by the user, all atoms within the radius of the selection sphere would be within the specified distance of the given atom. One reason a user may want to know which atoms are within a specified distance of a given atom would be due to the fact that the given atom may be an important one in a given reaction. By modifying its immediate surroundings, it might be possible to magnify or lessen the importance of that atom in the reaction.

In another example scenario, a user may wish to determine the impact of rotating a bond. Specifically, if we were to rotate a molecule about a bond, a user may wish to determine whether the atoms that moved when the bond is rotated collide with any other atoms in the molecule(s). As the bond is rotated, each moveable atom sweeps out a torus. (If each atom were represented by a point in space, then a circle would be swept out by the rotation. However, atoms all have a radius and are usually represented as spheres. If you take a sphere and move it in a circular motion, you sweep out a torus). Therefore a torus selection tool or multiple torus selection tools (one for each atom that moved) would be used. If any of the torii intersect atoms within the molecule(s), those atoms are selected and are therefore the atoms that are collided with.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method for interactively selecting an object displayed in three dimensional space on a display unit, the method comprising the steps of:

providing a user with an option to select one or more three dimensional selection entities;

selecting an active selection entity from the one or more of the three dimensional selection entities;

superimposing the active selection entity on the display unit with the object in the three dimensional space; and selecting the object by manipulating the active selection entity by dynamically adjusting the scale of the active selection entity to encompass the object in three dimensions, wherein said selecting step includes the step of resolving a selection when the center of the object is within the active selection entity.

2. The method of claim 1, wherein said step of selecting includes the step of resolving a selection when the object is partially encompassed by the active selection entity.

3. The method of claim 1, wherein said step of selecting includes the step of resolving a selection when the object is completely encompassed within the active selection entity.

4. The method of claim 2, wherein said step of resolving further comprises the step of determining whether the object is partially encompassed by the active selection entity, wherein said step of determining comprises the steps of:

determining the maximum X, Y, Z coordinates of the object;

determining the minimum X, Y, Z coordinates of the object;

defining a bounding box from the maximum and minimum X, Y, Z coordinates; and determining whether the bounding box is partially encompassed by the active selection entity.

5. The method of claim 1, wherein said step of selecting further includes the step of defining a reference point for the active selection entity comprising the steps of:

enabling the user to specify a point in the three dimensional space;

if the specified point is a point on the object, setting the coordinates of the reference point to the coordinates of the point on the object; and if the specified point is not on the object, enabling the user to specify one or more components of the coordinates of the reference point.

6. The method of claim 1, wherein said step of selecting the object further comprises the step of dynamically moving the active selection entity in one or more of three dimensions associated with the three dimensional space.

7. The method of claim 1, wherein said step of selecting the object further comprises the step of dynamically rotating the active selection entity in three dimensions in accordance with the rotational orientation of the object.

8. A computer program product comprising a computer useable medium having computer program logic stored therein, said computer program logic enabling a computer to allow a user to interactively select an object displayed in three dimensional space on a display unit, wherein said computer program logic comprises:

means for enabling the computer to provide the user with an option to select one or more three dimensional selection entities;

means for enabling the computer to allow the user to select an active selection entity from the one or more of the three dimensional selection entities;

means for enabling the computer to superimpose the active selection entity on the display unit with the object in the three dimensional space; and means for enabling the computer to select the object by allowing the user to manipulate the active selection entity by dynamically adjusting the scale of the active selection entity to encompass the object in three dimensions, wherein said means for enabling the computer to select the object includes means for enabling the computer to resolve a selection when the center of the object is within the active selection entity.

9. The computer program product of claim 8, wherein said means for enabling the computer to select the object includes means for enabling the computer to resolve a selection when the object is partially encompassed by the active selection entity.

10. The computer program product of claim 8, wherein said means for enabling the computer to select the object includes means for enabling the computer to resolve a selection when the object is completely encompassed within the active selection entity.

11. The computer program product of claim 9, wherein said means for enabling the computer to resolve a selection further comprises means for enabling the computer to determine whether the object is partially encompassed by the active selection entity, including:

means for enabling the computer to determine the maximum X, Y, Z coordinates of the object;

means for enabling the computer to determine the minimum X, Y, Z coordinates of the object;

means for enabling the computer to define a bounding box from the maximum and minimum X, Y, Z coordinates; and means for enabling the computer to determine whether the bounding box is partially encompassed by the active selection entity.

* * * * *